(12) United States Patent
Takemoto

(10) Patent No.: US 11,772,981 B2
(45) Date of Patent: *Oct. 3, 2023

(54) STANNOUS OXIDE POWDER

(71) Applicant: JX Nippon Mining & Metals Corporation, Tokyo (JP)

(72) Inventor: Koichi Takemoto, Ibaraki (JP)

(73) Assignee: JX Metals Corporation, Tokyo (JP)

( * ) Notice: Subject to any disclaimer, the term of this patent is extended or adjusted under 35 U.S.C. 154(b) by 29 days.

This patent is subject to a terminal disclaimer.

(21) Appl. No.: 16/494,021

(22) PCT Filed: Apr. 11, 2019

(86) PCT No.: PCT/JP2019/015848
§ 371 (c)(1),
(2) Date: Sep. 13, 2019

(87) PCT Pub. No.: WO2020/021782
PCT Pub. Date: Jan. 30, 2020

(65) Prior Publication Data
US 2021/0331934 A1    Oct. 28, 2021

(30) Foreign Application Priority Data
Jul. 25, 2018   (JP) .................................. 2018-139668

(51) Int. Cl.
*C01G 19/02*    (2006.01)

(52) U.S. Cl.
CPC .......... *C01G 19/02* (2013.01); *C01P 2004/61* (2013.01); *C01P 2006/11* (2013.01); *C01P 2006/12* (2013.01); *C01P 2006/80* (2013.01)

(58) Field of Classification Search
None
See application file for complete search history.

(56) References Cited

U.S. PATENT DOCUMENTS

| | | | |
|---|---|---|---|
| 2008/0032132 | A1 | 2/2008 | Woodfield et al. |
| 2012/0195822 | A1 | 8/2012 | Werner et al. |
| 2013/0084414 | A1 | 4/2013 | Grandbois |
| (Continued) | | | |

FOREIGN PATENT DOCUMENTS

| | | |
|---|---|---|
| CN | 101367543 A | 2/2009 |
| CN | 103043711 A | 4/2013 |
| (Continued) | | |

OTHER PUBLICATIONS

WIPO International Search Report for PCT/JP2019/015848 dated Nov. 4, 2019, 8 pages.

(Continued)

*Primary Examiner* — Ronak C Patel
(74) *Attorney, Agent, or Firm* — Faegre Drinker Biddle & Reath LLP

(57) ABSTRACT

Provided is a stannous oxide powder that can be suitably used for supplying tin ions, and has improved solubility and at the same time has an improved handling property. A stannous oxide powder comprising stannous oxide and inevitable impurities, wherein a content of stannous oxide in a dry mass is 99.9% by mass or more; a specific surface area is from 0.1 to 1.0 $m^2/g$; a TAP density is from 2 to 4 $g/cm$; a 50% particle diameter is from 30 to 60 μm; and an angle of repose is from 10 to 33°.

4 Claims, 15 Drawing Sheets

(56) References Cited

U.S. PATENT DOCUMENTS

| | | | |
|---|---|---|---|
| 2014/0079618 A1 | 3/2014 | Katase et al. | |
| 2014/0127109 A1 | 5/2014 | Katase et al. | |
| 2017/0009078 A1* | 1/2017 | Katase | C09D 1/00 |
| 2018/0327274 A1 | 11/2018 | Hirano et al. | |
| 2020/0231461 A1 | 7/2020 | Takemoto et al. | |
| 2021/0047198 A1 | 2/2021 | Takemoto et al. | |
| 2021/0331934 A1 | 10/2021 | Takemoto | |

FOREIGN PATENT DOCUMENTS

| | | |
|---|---|---|
| CN | 106587139 A | 4/2017 |
| CN | 105813980 B | 8/2017 |
| CN | 107001065 A | 8/2017 |
| CN | 110997570 A | 4/2020 |
| CN | 111836781 A | 10/2020 |
| EP | 3070055 A1 | 9/2016 |
| EP | 3260420 A1 | 12/2017 |
| EP | 3712114 A1 | 9/2020 |
| EP | 3763677 A1 | 1/2021 |
| JP | 60221319 A | 11/1985 |
| JP | 6252130 A | 3/1987 |
| JP | S6252130 A | 3/1987 |
| JP | 11310415 A | 11/1991 |
| JP | 2007302496 A | 11/2007 |
| JP | 2009132570 A | 6/2009 |
| JP | 2012051762 A | 3/2012 |
| JP | 4975367 B2 | 7/2012 |
| JP | 2012236724 A | 12/2012 |
| JP | 201379186 A | 5/2013 |
| JP | 2016153361 A | 8/2016 |
| JP | 2016172885 A | 9/2016 |
| JP | 6095929 B2 | 3/2017 |
| TW | 1511928 B | 4/2012 |
| TW | 201704154 A | 2/2017 |
| WO | 2019171692 A1 | 9/2019 |

OTHER PUBLICATIONS

CN Office Action for the corresponding Chinese Patent Application No. 201980001813.3 dated Dec. 6, 2021, 15 pages, with English translation.
Extended European Search Report for corresponding EP 18877744.5 dated Dec. 11, 2020.
Korean Office Action with Translation for KR 10-2020-7002015 related to PCT/JP2018/034052 dated May 11, 2021, 10 pages.
International Search Report for PCT/JP2018/045006 dated Aug. 1, 2019, 3 pages.
Final Office Action for corresponding U.S. Appl. No. 16/652,609 dated Sep. 29, 2022, 35 pages.
Extended European Search Report for related EP 19768694.2 corresponding to PCT/JP2019/015848, dated Mar. 18, 2022, 7 pages.
JP Office Action with Translation for corresponding JP Patent Application No. 2020-504792 dated Oct. 5, 2022, 4 pages.
Chinese Office Action for Chinese Patent Application No. 201880090566.4 associated with related U.S. Appl. No. 16/970,439, dated Apr. 18, 2022, 14 pages (with translation).
Chinese Office Action for corresponding Chinese patent application No. 201980001813.3 dated Jul. 15, 2022, with translation, 15 pages.
Chinese Office Action for corresponding Chinese Application No. 201880049511.8 dated Jun. 21, 2022, 11 pages.
Chinese Office Action for corresponding Chinese Patent Application No. 201880090566.4, dated Dec. 2, 2022, 8 pages (including translation).
Chinese Office Action for corresponding Chinese Patent Application No. 201880049513.8, dated Dec. 13, 2022, 11 pages (including translation).
U.S. Office Action issued in corresponding U.S. Appl. No. 16/652,609 dated Mar. 16, 2023, 16 pages.
Chinese Office Action for the corresponding Chinese Patent Application No. 201980001813.3 dated Mar. 31, 2023 with Translation, 11 pages.
Chinese Office Action for corresponding Chinese Patent Application No. 201880090566.4 with translation, dated Apr. 1, 2023, 8 pages.
Chinese Office Action for corresponding Chinese Patent Application No. 201880049513.8 dated May 26, 2023 with Translation, 10 pages.

* cited by examiner

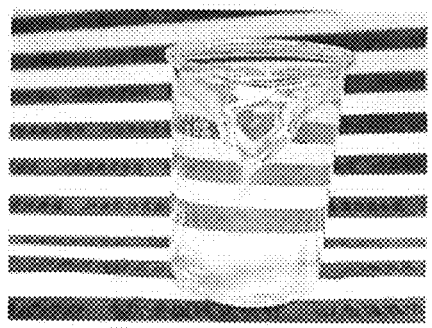
[FIG. 1]

[FIG. 2]
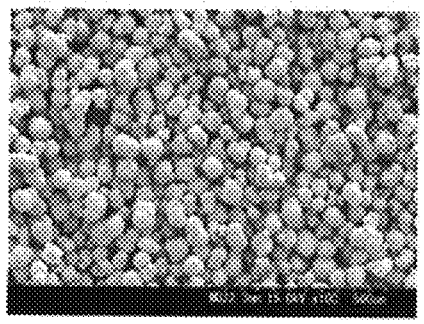

[FIG. 3]
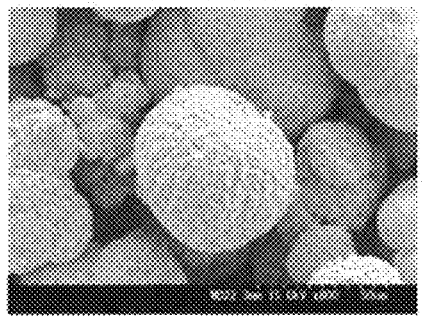

[FIG. 4]
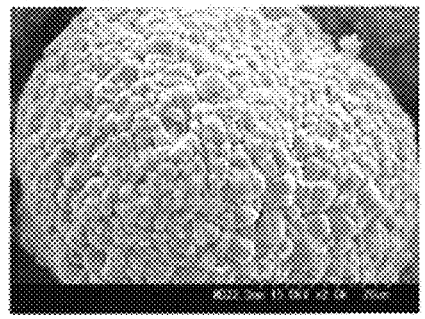

[FIG. 5]
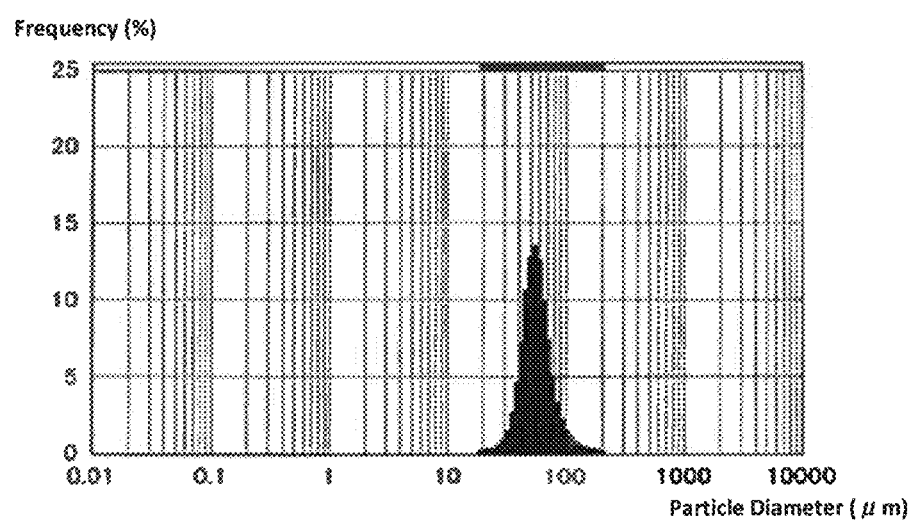

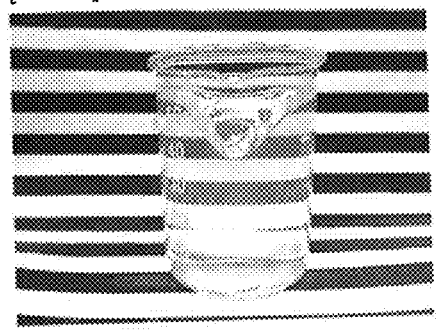
[FIG. 6]

[FIG. 7]
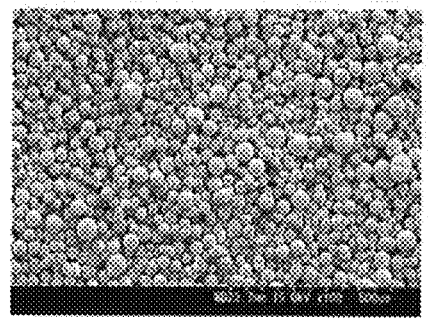

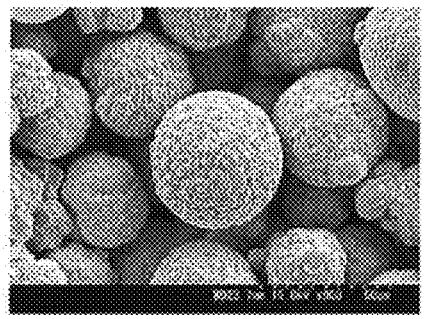
[FIG. 8]

[FIG. 9]
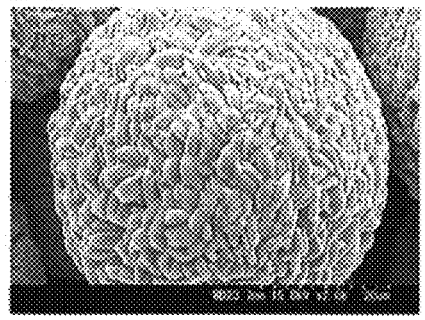

[FIG. 10]
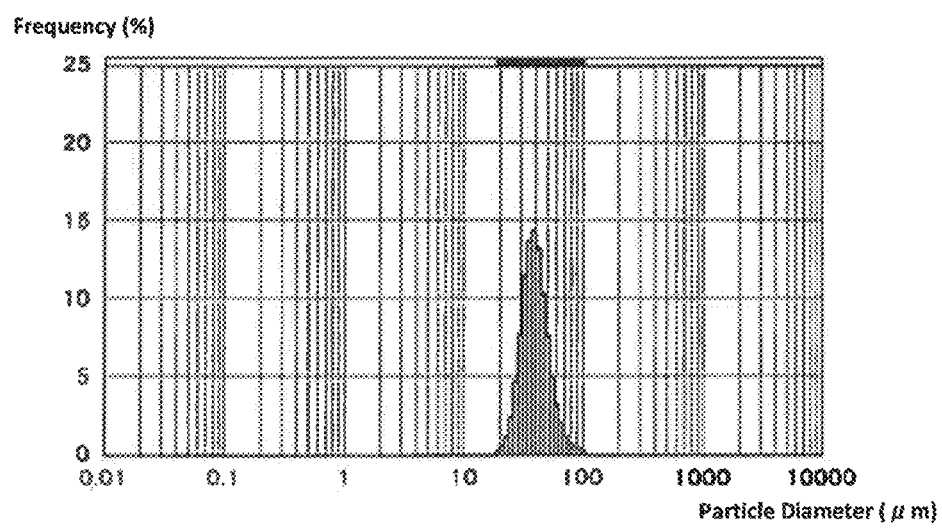

[FIG. 11]

[FIG. 12]
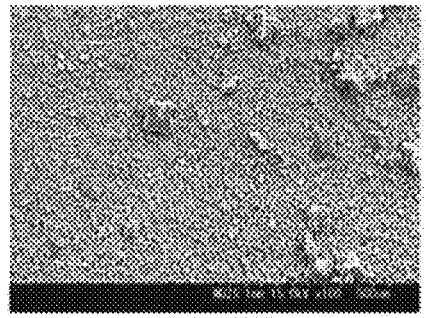

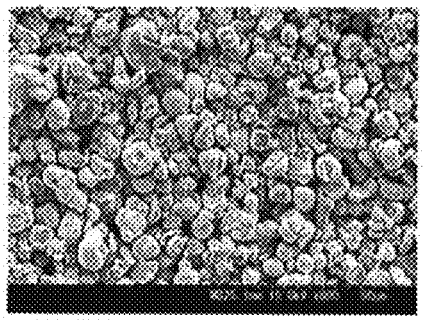
[FIG. 13]

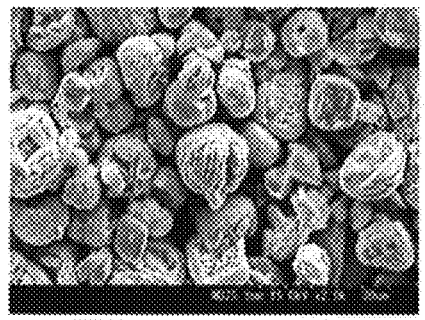
[FIG. 14]

[FIG. 15]
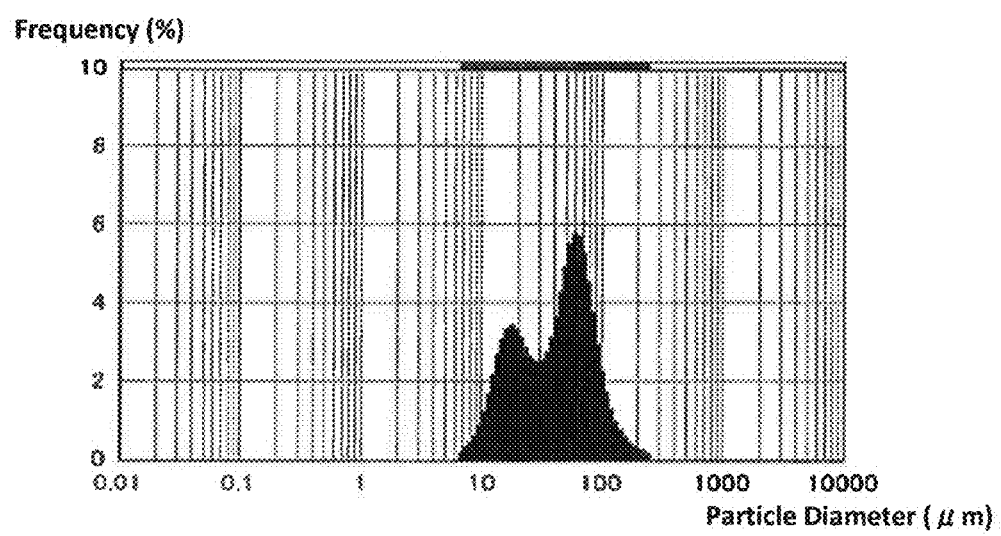

STANNOUS OXIDE POWDER

TECHNICAL FIELD

The present invention relates to stannous oxide powder.

BACKGROUND ART

When performing tin plating, an insoluble electrode (platinum, noble metal oxide, or the like) may be used in place of metallic tin as a positive electrode. In this case, stannous oxide is often added as a supplement for tin ions that are consumed from an electrolyte. Stannous oxide (SnO) has a higher dissolution rate than that of stannic oxide ($SnO_2$), and can allow easy production of a supplying solution.

Stannous oxide for supplying tin ions is required to have good solubility in addition to less impurities. In order to improve solubility, it is conventionally considered that a contact area with a solution is desirably increased. For example. Patent Document 1 (Japanese Patent Application Publication No. 2016-153361 A) discloses a technique for improving solubility of stannous oxide by increasing a specific surface area of grains of stannous oxide powder to have a shape with plate-like protrusions.

CITATION LIST

Patent Literature

Patent Document 1: Japanese Patent Application Publication No. 2016-153361 A

SUMMARY OF INVENTION

Technical Problem

According to studies by the present inventors, the powder having the shape as in Patent Document 1 has poor fluidity in a powder state, and the use of the powder in a manner of automatically supplying it to a plating bath often leads to blocking of a supply passage, resulting in a poor handling property.

That is, there is a need for stannous oxide powder for supplying tin ions, which has improved solubility and at the same time has improved handling property in automatic suppling.

Accordingly, an object of the present invention is to provide a stannous oxide powder that can be suitably used for supplying tin ions, and has improved solubility and at the same time has an improved handling property.

Solution to Problem

As a result of intensive studies to solve the above problems, the present inventors have found that a stannous oxide powder as described below has improved solubility and at the same time has an improved handling property, and have arrived at the present invention.

Therefore, the present invention includes the following aspect (1):
(1)
A stannous oxide powder comprising stannous oxide and inevitable impurities, wherein:
a content of stannous oxide in a dry mass is 99.9% by mass or more;
a specific surface area is from 0.1 to 1.0 $m^2/g$;
a TAP density is from 2 to 4 $g/cm^3$;
a 50% particle diameter is from 30 to 60 μm; and
an angle of repose is from 10 to 33°.

Advantageous Effects of Invention

The stannous oxide powder according to the present invention has improved solubility and also has an improved handling property, and it can be suitably used as a stannous oxide powder for supplying tin ions without blocking a supply passage even in the form of powder.

BRIEF DESCRIPTION OF DRAWINGS

FIG. 1 shows an appearance of a solution of a stannous oxide powder of Example 1 after dissolution in a dissolution test.

FIG. 2 shows a SEM image at magnifications of 100 for a stannous oxide powder of Example 1 as observed by SEM.

FIG. 3 shows a SEM image at magnifications of 800 for a stannous oxide powder of Example 1 as observed by SEM.

FIG. 4 shows a SEM image at magnifications of 2000 for a stannous oxide powder of Example 1 as observed by SEM.

FIG. 5 shows a graph of a particle size distribution of a stannous oxide powder of Example 1.

FIG. 6 shows an appearance of a solution of a stannous oxide powder of Example 2 after dissolution in a dissolution test.

FIG. 7 shows a SEM image at magnifications of 100 for a stannous oxide powder of Example 2 as observed by SEM.

FIG. 8 shows a SEM image at magnifications of 800 for a stannous oxide powder of Example 2 as observed by SEM.

FIG. 9 shows a SEM image at magnifications of 2000 for a stannous oxide powder of Example 2 as observed by SEM.

FIG. 10 shows a graph of a particle size distribution of a stannous oxide powder of Example 2.

FIG. 11 shows an appearance of a solution of a stannous oxide powder of Comparative Example 1 after dissolution in a dissolution test.

FIG. 12 shows a SEM image at magnifications of 100 for a stannous oxide powder of Comparative Example 1 as observed by SEM.

FIG. 13 shows an SEM image at magnifications of 800 for a stannous oxide powder of Comparative Example 1 as observed by SEM.

FIG. 14 shows a SEM image at magnifications of 2000 for a stannous oxide powder of Comparative Example 1 as observed by SEM.

FIG. 15 shows a graph of a particle size distribution of a stannous oxide powder of Comparative Example 1.

DESCRIPTION OF THE PREFERRED EMBODIMENTS

The present invention will be described in detail below with reference to embodiments.

The present invention is not limited to the specific embodiments described below.
[Stannous Oxide Powder]

In a preferable embodiment, the stannous oxide powder according to the present invention relates to:
a stannous oxide powder comprising stannous oxide and inevitable impurities, wherein:
a content of stannous oxide in a dry mass is 99.9% by mass or more;
a specific surface area is from 0.1 to 1.0 $m^2/g$;
a TAP density is from 2 to 4 $g/cm^3$;

a 50% particle diameter is from 30 to 60 µm; and
an angle of repose is from 10 to 33°.

In a preferred embodiment, the stannous oxide powder can be prepared by carrying out a step of subjecting stannous sulfate to neutralization reaction with ammonium carbonate or ammonium bicarbonate in an aqueous solution to precipitate stannous oxide; and a step of drying the resulting stannous oxide, under the following conditions, respectively.

[Neutralization Reaction]

In a preferred embodiment, the neutralization reaction is carried out by adding an aqueous stannous sulfate solution to an aqueous ammonium carbonate or ammonium bicarbonate solution. The addition of the aqueous stannous sulfate solution can be performed by known means, for example, means such as dropping, injecting, and spraying. In a preferred embodiment, the aqueous solution is optionally stirred during the neutralization reaction. The stirring can be carried out by known means.

[pH]

In a preferred embodiment, the neutralization reaction is carried out in an aqueous solution, for example in a range of from pH 7.0 to pH 8.0. The pH can be adjusted, for example, by adding ammonium carbonate, ammonium bicarbonate, or aqueous ammonia. Alternatively, the pH may be adjusted by blowing carbon dioxide into the reaction solution. The pH value is preferably maintained in the above range through two stage temperature adjustment as described later.

[Reaction Temperature and Time]

In a preferred embodiment, the temperature of the solution subjected to the neutralization reaction is adjusted in two stages. That is, the reaction temperature is adjusted in two stages: a temperature at which the neutralization reaction is allowed to proceed by dropping the stannous sulfate solution and the aqueous ammonium carbonate or ammonium bicarbonate solution (a first stage reaction temperature); and a temperature at which the neutralization reaction is maintained after the end of the dropping (a second stage reaction temperature). The temperature during dropping, i.e., the first stage temperature can be from 65 to 75° C., for example. The dropping time, i.e., a retention time of the first stage temperature can be from 1 to 2 hours, for example. The retention temperature after dropping, i.e., the second stage temperature, can be from 75 to 85° C., for example. The retention time after dropping, i.e., the retention time of the second stage temperature can be from 1 to 3 hours, for example.

[Ammonium Bicarbonate Concentration]

When the aqueous ammonium bicarbonate solution is used in the neutralization reaction, a concentration of ammonium bicarbonate can be, for example, in a range of from 150 to 200 g/L. When the aqueous ammonium carbonate solution is used in the neutralization reaction, it can be suitably used in the same concentration range as that of ammonium bicarbonate.

[Tin Concentration]

When the aqueous stannous sulfate solution is used in the neutralization reaction, a concentration of tin in the aqueous stannous sulfate solution can be, for example, in a range of from 60 to 110 g/L.

[Deposition of Stannous Oxide]

By the neutralization reaction, stannous oxide is deposited and precipitated. The resulting precipitate can be subjected to solid-liquid separation to obtain stannous oxide powder. The solid-liquid separation can be carried out by a known means such as suction, squeeze filtration, decantation, and centrifugation. The stannous oxide powder may be washed as desired, for example, in combination with a separating means such as centrifugation.

[Purity of Stannous Oxide Powder]

Stannous oxide (SnO) powder obtained by the present invention is composed of stannous oxide and inevitable impurities, and can have, as a content excluding moisture, for example, a stannous oxide content of 99.9% by mass or more, preferably 99.99% by mass or more, more preferably 99.995% by mass or more, for example, in a range of from 99.99 to 99.995% by mass, preferably from 99.99 to 99.999% by mass. The content of impurities as described later can be determined by means of an ICP mass spectrometer (commonly known as ICP-MS), an ICP optical emission spectrometer (commonly known as ICP-OES), a flame atomic absorption spectrometer (commonly known as AAS), a chlorine/sulfur analyzer/total organic halogen analyzer (commonly known as TOX) and a carbon/sulfur analyzer (commonly known as LECO).

[Cl Content]

In a preferred embodiment, a Cl content (chlorine content) of the stannous oxide powder can be, for example, less than 5 ppm, and preferably less than 1 ppm, and more preferably less than 1 ppm, as a content excluding moisture. The stannous oxide according to the present invention can allow a significantly decreased Cl content because the use of a hydrochloric acid-based aqueous solution is avoided in the production. The Cl content can be measured by TOX (TOX-2100H from Mitsubishi Chemical Analytech Co., Ltd.).

[S Content]

In a preferred embodiment, a S content (sulfur content) of the stannous oxide powder can be, for example, less than 20 ppm, and preferably 10 ppm or less, and more preferably less than 10 ppm, as a content excluding moisture. The stannous oxide according to the present invention can allow a significantly decreased S content despite the use of the aqueous sulfate solution in the production. The S content can be measured by LECO (CSLS600 available LECO JAPAN CORPORATION).

[Na Content and K Content]

In a preferred embodiment, a Na content (sodium content) of the stannous oxide powder can be, for example, 5 ppm or less, and preferably 1 ppm or less, and more preferably less than 1 ppm (less than the detection limit), as a content excluding moisture. In a preferred embodiment, a K content (potassium content) of the stannous oxide can be, for example, 5 ppm or less, and preferably 1 ppm or less, and more preferably less than 1 ppm (less than the detection limit). The stannous oxide according to the present invention can allow significantly decreased Na and K contents because the use of sodium-containing materials and potassium-containing materials is avoided in the production. The Na and K contents can be measured by AAS (AA240FS available from Agilent Technologies).

[Other Impurity Content]

In a preferred embodiment, the impurities in the stannous oxide powder can have the following contents, as contents measured by ICP-MS (SPQ9700 from Hitachi High-Tech Science Co., Ltd.) for Ag, As, Bi, Cd, Cr, Cu, In, Mg, Mn, Pb, Sb, Th, Tl, U and Zn, and the following contents measured by ICP-OES (SPS3500DD from Hitachi High-Tech Science Co., Ltd.) for Ca, Co, Fe, Ni, and P:

The Ag content is 1 ppm or less, preferably less than 1 ppm (less than the detection limit); the As content is 1 ppm or less, preferably less than 1 ppm (less than the detection limit); the Bi content is less than 1 ppm, preferably less than 1 ppm (less than the detection limit); the Ca content is 1 ppm or less, preferably less than 1 ppm (less than the detection limit); the Cd content is 1 ppm or less, preferably less than 1 ppm (less than the detection limit); the Co content is 1 ppm or less, preferably less than 1 ppm (less than the detection limit); the Cr content is 1 ppm or less, preferably less than 1 ppm (less than the detection limit); the Cu content is 1 ppm or less, preferably less than 1 ppm (less than the detection limit); the Fe content is 1 ppm or less, preferably less than 1 ppm (less than the detection limit); the In content is 1 ppm or less, preferably less than 1 ppm (less than the detection limit); the Mg content is 1 ppm or less, preferably less than 1 ppm (less than detection limit); the Mn content is 1 ppm or less, preferably less than 1 ppm (less than detection limit); the Ni content is 1 ppm or less, preferably less than 1 ppm (less than detection limit); the Pb content is 1 ppm or less, preferably less than 1 ppm (less than detection limit); the Th content is 1 ppm or less, preferably less than 1 ppm (less than the detection limit); the Tl content is 1 ppm or less, preferably less than 1 ppm (less than the detection limit); the U content is 1 ppm or less, preferably less than 1 ppm (less than the detection limit); the Zn content is 1 ppm or less, preferably less than 1 ppm (less than the detection limit); the P content is 20 ppm or less, preferably 10 ppm or less, more preferably less than 10 ppm (less than the detection limit); and the Sb content is 5 ppm or less, preferably 2 ppm or less, more preferably 1.6 ppm or less. Alternatively, the Sb content is the above upper limit and 0.1 ppm or more, preferably 0.5 ppm or more, more preferably 1.0 ppm or more.

[Shape of Stannous Oxide Powder]

In a preferred embodiment, a secondary particle of the stannous oxide powder (stannous oxide powder) has for example, a spherical shape and a combined shape thereof.

[Specific Surface Area]

In a preferred embodiment, the stannous oxide powder can have a specific surface area of, for example, 1.0 m$^2$/g or less, preferably 0.5 m$^2$/g or less, for example from 0.1 to 1.0 m$^2$/g, preferably from 0.1 to 0.9 m$^2$/g, more preferably from 0.15 to 0.5 m$^2$/g. The specific surface area according to the present invention can be measured by Monosorb MS-21 from QUANTA CHROME.

[TAP Density]

In a preferred embodiment, the stannous oxide powder can have a TAP density, for example in a range of from 1.0 to 4.0 g/cm$^3$, preferably from 2.0 to 4.0 g/cm$^3$, more preferably from 2.5 to 3.5 g/cm$^3$. The TAP density according to the present invention can be measured by TAPDENSER KYT-4000K from SEISHIN ENTERPRISES Co., Ltd.

[50% Particle Diameter (D50)]

In a preferred embodiment, the stannous oxide powder can have a 50% particle diameter (D50), for example in a range of from 20 to 60 μm, preferably from 30 to 60 μm, more preferably from 40 to 60 μm. The 50% particle diameter (D50) according to the present invention can be measured by MT3300EX2 from MicrotracBell Corp.

[Angle of Repose]

In a preferred embodiment, the stannous oxide powder can have an angle of repose of, for example, 33° or less, preferably 30° or less, for example in a range of from 10 to 33°, preferably in a range of from 15 to 30°. The angle of repose refers to an angle formed between a generating line of a cone obtained by dropping and depositing powder onto a horizontal plane and a horizontal plane. The angle of repose can be measured using, for example, a powder tester (PT-S from Hosokawa Micron Corporation). In a preferred embodiment, the stannous oxide powder according to the present invention is a dry powder having the improved angle of repose as described above. The dry powder is a powder that has been dried, and specifically refers to a powder that has been dried to a moisture content of less than 0.1% by weight.

In a preferred embodiment, the stannous oxide powder according to the present invention has the improved angle of repose as stated above, whereby it can be suitably used for supplying a plating solution while maintaining the form of powder.

[Solubility]

The stannous oxide powder according to the present invention has improved solubility and can be suitably used for supplying a plating solution. The solubility as used herein refers to solubility in a methanesulfonic acid solution. The solubility can be obtained as solubility under conditions of Examples as described later. That is, the solubility can be quantified by adding and dissolving 100 g/L of stannous oxide powder to and in a solution having a methanesulfonic acid concentration of 100 g/L and measuring a time (dissolution time) from disappearance of the black color of stannous to colorless and transparent or pale yellow color. In a preferred embodiment, the improved solubility can refer to a case where a turbidity after dissolution is 20 degrees and the dissolution time is 30 seconds or less, and a particularly improved solubility can refer to a case where the dissolution time is preferably 20 seconds or less, more preferably 10 seconds or less.

When using a turbidity after a sufficient time as an index of solubility, the index can be a turbidity after dissolving tin oxide in methanesulfonic acid and allowing it to stand for 5 minutes. The turbidity is "20 degrees" in pure water (colorless and transparent), and the maximum value is "500 degrees". As shown in Examples as described later, in a preferred embodiment, the turbidity of the solution of the stannous oxide powder according to the present invention can be "20 degrees". The turbidity can be measured with a turbidity meter, and examples of the turbidity meter include a digital turbidity meter 500G (model TB-500G) from Kyoritsu Chemical-Check Lab., Corp.

Preferred Embodiment

In a preferred embodiment, the present invention may include the following aspects:

(1)

A stannous oxide powder comprising stannous oxide and inevitable impurities, wherein:
a content of stannous oxide in a dry mass is 99.9% by mass or more;
a specific surface area is from 0.1 to 1.0 m$^2$/g;
a TAP density is from 2 to 4 g/cm$^3$;
a 50% particle diameter is from 30 to 60 μm; and
an angle of repose is from 10 to 33°.

(2)

The stannous oxide powder according to (1), wherein the stannous oxide powder has a chlorine content of 1 ppm or less and a sulfur content of 10 ppm or less.

(3)

The stannous oxide powder according to (1), wherein the stannous oxide powder has each content of Ag, As, Bi, Ca, Cd, Co, Cr, Cu, Fe, In, K, Mg, Mn, Na, Ni, Pb, Th, Tl, U, and Zn of 1 ppm or less, each content of P and S of 10 ppm or less, a content of Cl of 1 ppm or less, and a content of Sb of from 1 to 5 ppm.

(4)

The stannous oxide power according to any one of (1) to (3), wherein when 100 g/L of stannous oxide powder is added to a solution having a methanesulfonic acid concentration of 100 g/L, the stannous oxide is dissolved in the solution for 30 seconds or less and has a turbidity after dissolution of 20 degrees.

EXAMPLES

Hereinafter, the present invention will be described in more detail with reference to Examples. The present invention is not limited to the following Examples.

Example 1

[Production of Stannous Oxide]

20 L of pure water was placed in a 50 L glass round bottom vessel as a reaction vessel, and 175 g/L of ammonium bicarbonate was added to obtain a reaction mother solution. This solution was maintained while heating it.

20 L of a tin sulfate solution (tin concentration: 100 g/L) previously prepared by electrolysis of metallic tin was dropped in the ammonium bicarbonate solution. The solution temperature during the dropping reaction was maintained at 65° C. to 70° C. in an oil bath (first stage heat-maintaining temperature). The dropping was carried out using an electromagnetic metering pump over about 2 hours. During the reaction, stirring was carried out using a stirrer. During the reaction, the acidic tin sulfate solution was introduced, so that the pH was decreased. Therefore, ammonium bicarbonate crystals were optionally added such that the pH could be maintained at 7.0 to 7.5.

At the end of the dropping, the temperature was raised to 75 to 80° C. and maintained for about 1 hour (second stage heat-maintaining temperature).

After the reaction, the resulting slurry was extracted, filtered and washed, and dried at 80° C. for 16 hours to obtain a stannous oxide powder.

Particulate stannous oxide was thus obtained. The reaction formula for the neutralization reaction is shown below:

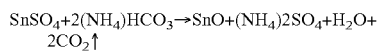

$SnSO_4 + 2(NH_4)HCO_3 \rightarrow SnO + (NH_4)_2SO_4 + H_2O + 2CO_2\uparrow$

[Evaluation of Stannous Oxide]

The resulting particulate stannous oxide was evaluated as follows. The results obtained are summarized in Table 1.

The impurity content was analyzed using ICP-MS, ICP-OES, AAS, TOX, LECO and the like.

The specific surface area was measured using Monosorb MS-21 from QUANTA CHROME.

The TAP density was measured using TAPDENSER KYT-4000K from SEISHIN ENTERPRISE CO., LTD.

The particle diameter was measured by MT3300EX2 from Microtrack Bell Co., Ltd.

The angle of repose was measured by PT-S from Hosokawa Micron Group.

[Solubility]

The solubility of the resulting stannous oxide powder was evaluated by determining a dissolution time as follows:

7.5 mL of 96% methanesulfonic acid was collected and dilute to 50 mL with pure water. Stannous oxide (5.0 g) was rapidly introduced into an aqueous methanesulfonic acid solution in a 50 mL beaker, and the time from introduction to dissolution was measured while stirring the solution with a stirrer at 500 rpm. The solution temperature at this time was 23° C. Based on visual observation that black turbidity became colorless and transparent, it was determined that the dissolution was completed, and the time was measured. Further, turbidity after dissolving tin oxide in methanesulfonic acid and allowing it to stand for 5 minutes was measured with a digital turbidity meter 500G (model TB-500G) from KYORITSU CHEMICAL-CHECK Lab., Corp. These results are summarized in Table 1. Moreover, FIG. 1 shows an appearance of the solution of the stannous oxide powder of Example 1 after dissolution in the dissolution test.

[SEM Image]

The resulting stannous oxide powder was observed by SEM (Electron Microscope S-3000N from Hitachi High-Technologies Corporation). SEM images of the stannous oxide powder of Example 1 are shown in FIGS. 2 to 4. FIG. 2 is the SEM image at magnifications of 100, FIG. 3 is the SEM image at magnifications of 800, and FIG. 4 is the SEM image at magnifications of 2000.

[Particle Size Distribution]

The particle size distribution of the resulting stannous oxide powder was measured by MT3300EX2 from MicrotracBel Corp. FIG. 5 shows a graph of the particle size distribution of the stannous oxide powder of Example 1.

Example 2

As Example 2, stannous oxide powder was obtained in the same procedure as that of Example 1 with the exception that the conditions were changed as follows:

That is, in Example 1, the introduced amount of ammonium bicarbonate for obtaining the reaction mother solution was increased so as to obtain 200 g/L of ammonium bicarbonate. Further, the solution was heated and maintained at 70° C. to 75° C., the solution temperature during the dropping reaction was maintained at 70° C. to 75° C. (first stage heat-maintaining temperature), and the dropping was carried out over about 1 hour. The pH was maintained at 7.5 to 8.0. At the end of the dropping, the temperature was raised to 80 to 85° C. and further maintained for about 3 hours (second heat-maintaining temperature).

The resulting stannous oxide powder of Example 2 was evaluated in the same procedure as that of Example 1. The results are summarized in Table 1. FIG. 6 shows an appearance of the solution of the stannous oxide powder of Example 2 after dissolution in the dissolution test.

SEM images of the stannous oxide powder of Example 2 are shown in FIGS. 7 to 9. FIG. 7 is the SEM image at magnifications of 100, FIG. 8 is the SEM image at magnifications of 800, and FIG. 9 is the SEM image at magnifications of 2000.

FIG. 10 shows a graph of the particle size distribution of the stannous oxide powder of Example 2.

Comparative Example 1

Commercially available stannous oxide powder (available from JX Metals Trading Co., Ltd.) was prepared and evaluated in the same procedure as that of Example 1. The results are summarized in Table 1.

FIG. 11 shows appearance of the solution of the stannous oxide powder of Comparative Example 1 after dissolution in the dissolution test.

SEM images of the stannous oxide powder of Comparative Example 1 are shown in FIGS. 12 to 14. FIG. 12 is the SEM image at magnifications of 100, FIG. 13 is the SEM image at magnifications of 800, and FIG. 14 is the SEM image at magnifications of 2000.

FIG. 15 shows a graph of the particle size distribution of the stannous oxide powder of Comparative Example 1.

TABLE 1

| Examples | Impurities | Specific Surface Area (m²/g) | TAP Density (g/cm³) | 50% Particle Diameter (μm) | Angle of Repose (°) | Dissolution Time and Turbidity |
|---|---|---|---|---|---|---|
| Example 1 | Ag, As, Bi, Ca, Cd, Co, Cr, Cu, Fe, In, K, Mg, Mn, Na, Ni, Pb, Th, Tl, U, Zn <1 ppm; P, S: <10 ppm; Cl: <1 ppm; Sb: 1.6 ppm | 0.19 | 3.33 | 45.3 | 29.2 | 10 sec. 20 degrees |
| Example 2 | Ag, As, Bi, Ca, Cd, Co, Cr, Cu, Fe, In, K, Mg, Mn, Na, Ni, Pb, Th, Tl, U, Zn: <1 ppm; P, S: <10 ppm; Cl: <1 ppm; Sb: 2.0 ppm | 0.49 | 2.77 | 52.6 | 30.6 | 10 sec. 20 degrees |
| Comparative Example 1 | Ca: 57 ppm; Co: 2 ppm; Cr: 1.2 ppm; Cu: 1.8 ppm; Fe: 18 ppm; K: <1 ppm; Mg: 8.9 ppm; Na: 440 ppm; Pb: 42 ppm; Th <1 ppm; U: <1 ppm; Zn: <1 ppm, Cl: 110 ppm; Sb: 1.7 ppm | 0.40 | 3.33 | 55.3 | 34.6 | 30 sec. 20 degrees |

INDUSTRIAL APPLICABILITY

According to the present invention, a stannous oxide powder having improved solubility and also improved handling property is provided. The present invention is an industrially useful invention.

What is claimed is:

1. A stannous oxide powder comprising stannous oxide and inevitable impurities, wherein:
   a content of stannous oxide in a dry mass is 99.9% by mass or more;
   a specific surface area is from 0.1 to 1.0 m²/g;
   a TAP density is from 2 to 4 g/cm³;
   a 50% particle diameter is from 30 to 60 μm; and
   an angle of repose is from 10 to 33°;
   wherein the stannous oxide powder has each content of Ag, As, Bi, Ca, Cd, Co, Cr, Cu, Fe, In, K, Mg, Mn, Na, Ni, Pb, Th, Tl, U, and Zn of 1 ppm or less, each content of P and S of 10 ppm or less, a content of Cl of 1 ppm or less, and a content of Sb of from 1 to 5 ppm.

2. The stannous oxide powder according to claim 1, wherein the stannous oxide powder has a chlorine content of 1 ppm or less and a sulfur content of 10 ppm or less.

3. The stannous oxide power according to claim 2, wherein when 100 g/L of stannous oxide powder is added to a solution having a methanesulfonic acid concentration of 100 g/L, the stannous oxide is dissolved in the solution for 30 seconds or less, and has a turbidity after dissolution of 20 degrees.

4. The stannous oxide power according to claim 1, wherein when 100 g/L of stannous oxide powder is added to a solution having a methanesulfonic acid concentration of 100 g/L, the stannous oxide is dissolved in the solution for 30 seconds or less, and has a turbidity after dissolution of 20 degrees.

* * * * *